(No Model.)
E. W. JETER.
CHURN.
No. 299,550. Patented June 3, 1884.
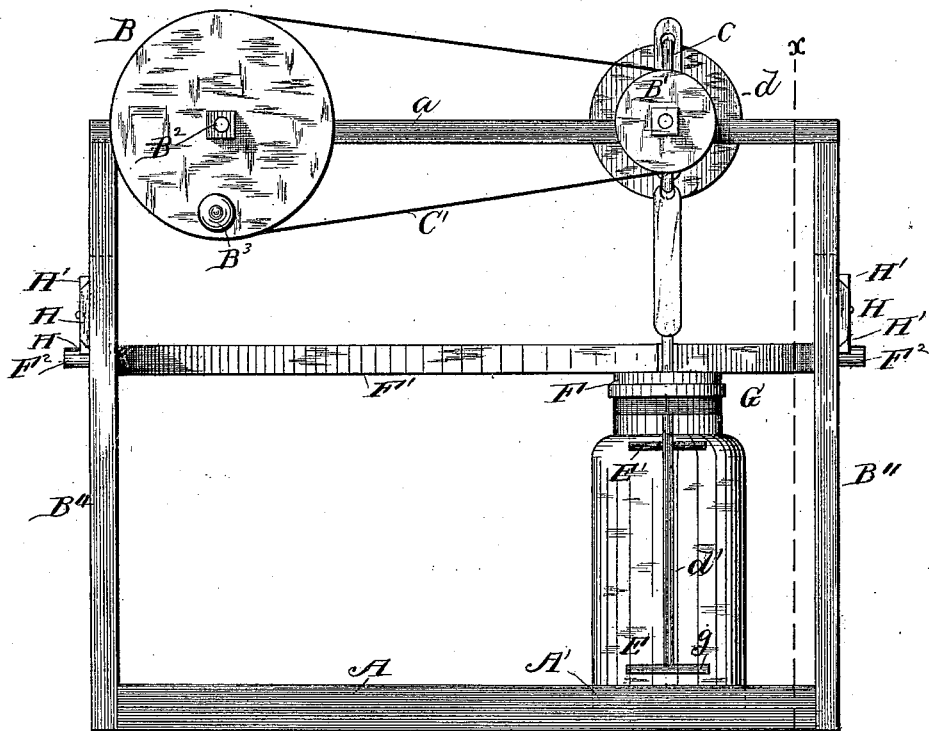
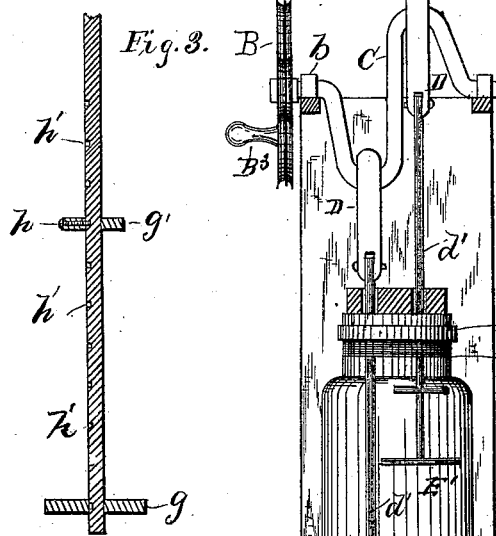
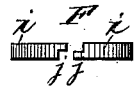
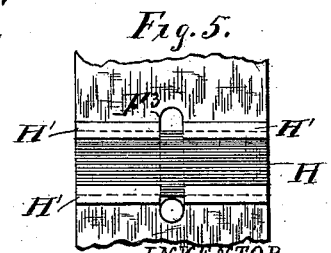
WITNESSES
W. E. Bowen
G. H. Harvey
INVENTOR
Edmond W. Jeter
By Myers & Co
Attorneys

UNITED STATES PATENT OFFICE.

EDMOND W. JETER, OF CONYERS, GEORGIA, ASSIGNOR OF ONE-HALF TO JOHN H. DABNEY, OF SAME PLACE.

CHURN.

SPECIFICATION forming part of Letters Patent No. 299,550, dated June 3, 1884.

Application filed January 17, 1884. (No model.)

*To all whom it may concern:*

Be it known that I, E. W. JETER, a citizen of the United States of America, residing at Conyers, in the county of Rockdale and State of Georgia, have invented certain new and useful Improvements in Churns, of which the follow is a specification, reference being had therein to the accompanying drawings.

My invention pertains to an improvement in churns; and it consists in the novel construction, combination, and arrangement of the parts, substantially as hereinafter more fully shown and described.

In the drawings, Figure 1 is a side elevation. Fig. 2 is a vertical section on the line $x\ x$, Fig. 1; and Figs. 3, 4, 5, and 6 are detail views.

In the construction of my churn I provide in the platform A the churn-socket A', and rigidly secure to the standards B'' the cross-piece $a$, having a suitable opening therein for the play of the double crank $c$. The driving-wheel B, having axle $B^2$ and propelling-crank $B^3$, I mount upon the cross-piece $a$, and connect it with crank-pulley B' by means of the belting C'. The double crank C is pivoted by means of bracket-sockets $b$ on the top of the cross-piece $a$, the ends of the crank being squared, passed through, and nutted in coincident apertures provided in the crank-pulley B' and the balance-wheel $d$, the latter being located on the opposite side of cross-piece $a$. The double dasher comprises the corresponding parts or sections E and E', and each section is secured to a link-bar, D, having an orifice near the top thereof, through which projects crank C, and a mortise at bottom, in which is pivoted the rod $d'$ of each churn-dasher. The dasher-sections E and E' are respectively provided with similar semicircular dashers, $g$, each rigidly secured to its rod $d'$, and with the movable dashers $g'$, the latter being adjustable, and secured by means of pins or thumb-screws $h$ in connection with the coincident orifice $h'$. The dasher is thus constructed to admit one part or dasher thereof of each section being submerged in the cream, and the other or upper part thereof being located above its surface, in order that the cream may be impinged by the dashers descending thereon simultaneously with the churning motion produced by the submerged dashers. The cover F is divided into the corresponding parts $i$ and $i$, shouldered at $j\ j$, Fig. 4, in order to admit its being handled in sections, the sections being fitted immediately over the stopper G, as shown. The cover-clamp F' is slotted for reception of the dasher-rods $d'$, and has formed on either end thereof the pins $F^2$, which project through and slightly beyond coincident slots formed in the standards B. The cover-clamp F' fits flush upon the churn-cover, and to this end each of the walls B'' is provided with a recess, $F^3$, (see Fig. 5,) and is secured rigidly in position by means of the thumb-slides H, which are adjustable in the beveled cleat-guides H', the thumb-slides being also coincidently beveled, as shown. Thus constructed, when the churn is to be removed, one of the slides H is withdrawn, and a pin, $F^2$, of the cover-clamp is elevated in its slot, and the slide is then reinserted beneath the pin of the cover-clamp, and thus holds the cover-clamp in an elevated position until such time as it is again desirable to re-cover the churn or to restore it to its socket A' in the platform A.

In order to further brace or strengthen the double crank C against the strain to which it is subjected by the belting on pulley B', which has its bearings thereon, I provide the bracket K, (see Fig. 6,) having a central journal-orifice for reception of the horizontal or journal end of crank C, as shown, which bracket spans pulley B', and is secured at either end to the cross-piece $a$.

Having described my invention, what I claim, and desire to secure by Letters Patent, is—

1. In a churn, the combination of the driving mechanism, the dasher-sections E and E', cover F, clamp F', slide H, secured by cleat-guides H', and slotted standards B'', substantially as shown, and for the purpose described.

2. The combination of the churn having cover F, cover-clamp F', slide H, secured by cleat-guides H', and slotted standards B'', substantially as shown, and for the purpose described.

3. In a churn, the combination of pulley B', secured by bracket K, the double crank C, the dasher-sections E and E', cover F, having clamp F', slide H, secured by cleat-guides H', and slotted standards B'', substantially as shown, and for the purpose described.

In testimony whereof I affix my signature in presence of two witnesses.

EDMOND W. JETER.

Witnesses:
   JOHN H. ALMAND,
   JAMES J. LANGFORD.